May 24, 1949. E. GAULKE 2,471,269
RIGGER'S VISE FOR SPLICING WIRE AND LIKE MATERIAL
Filed Sept. 7, 1944
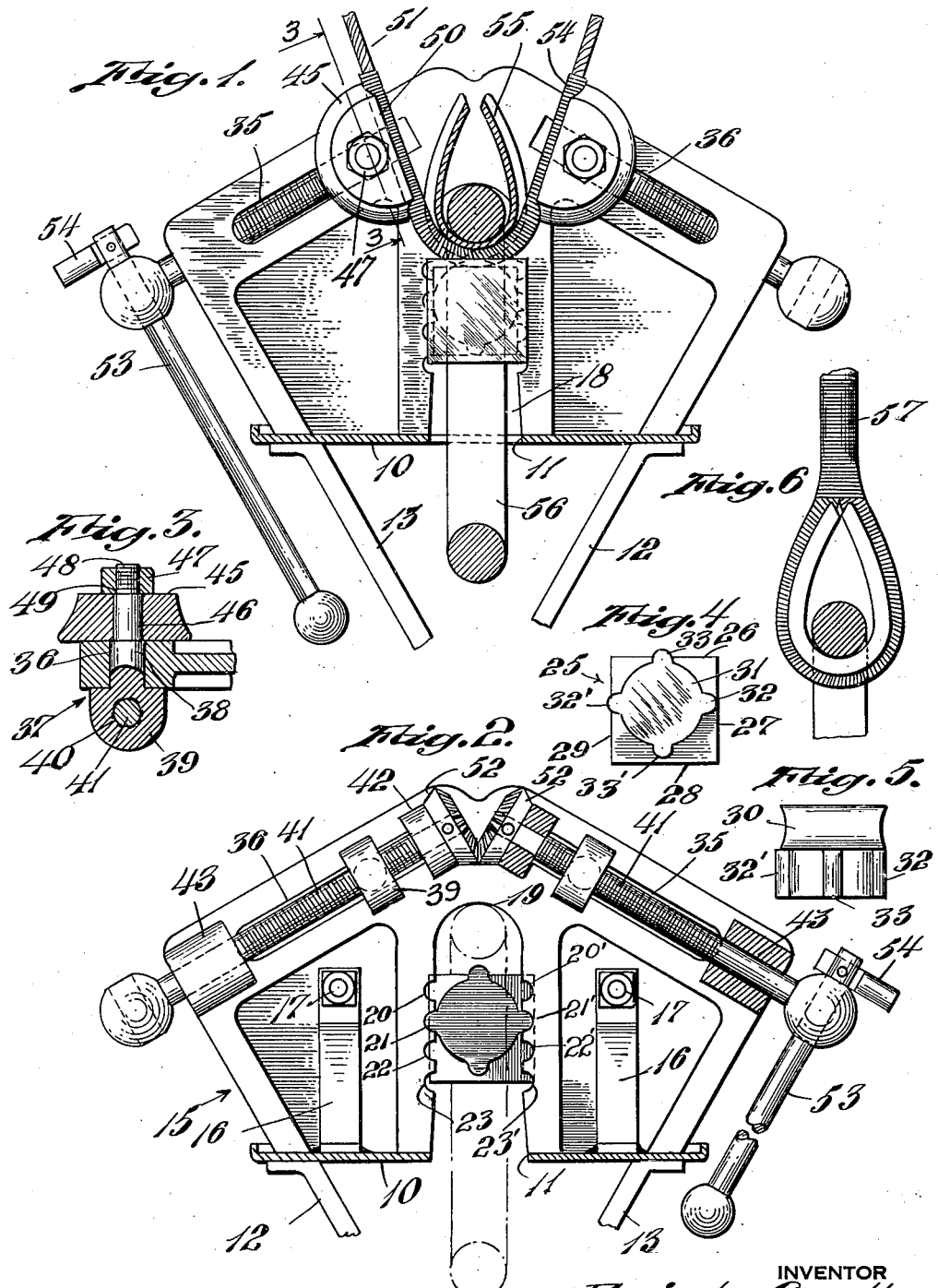
INVENTOR
Erich Gaulke
BY Barlow & Barlow
ATTORNEYS Patented May 24, 1949

2,471,269

UNITED STATES PATENT OFFICE 2,471,269

RIGGER'S VISE FOR SPLICING WIRE AND LIKE MATERIAL

Erich Gaulke, New Bedford, Mass.

Application September 7, 1944, Serial No. 553,033

3 Claims. (Cl. 81—17.5)

This invention relates to a vise particularly adapted for holding wire or other rigging such as may be used on shipboard or for a similar use.

In the handling of wire where it is necessary to provide an eye splice considerable difficulty is experienced in holding the wire in proper position while the strands are tucked to provide the splice and some mechanical equipment is necessary in order to bend and hold the wire in position. A rigger's vise is frequently utilized for this purpose but most rigger's vises have three jaws which approach each other along lines which are arranged at right angles to each other; that is two jaws will move inwardly on substantially the same line while a third jaw will approach this line. In some cases these three jaws move simultaneously while in other cases two of the jaws may move toward each other simultaneously while the third jaw is independently operable. Such vises also have a solid base and while they will receive a thimble, they will not take a thimble which is assembled with a ring, link, eye-bolt or any closed object and the vise is useless for such an assembly.

The primary object of this invention is to provide a vise which will receive and hold a wire around a thimble which is assembled with an enclosed article such as a ring or eye.

Another object of this invention is to provide only two movable jaws and arrange them at such an angle that it is unnecessary to provide a third jaw which is movable relative to the two jaws.

Another object of this invention is to provide an anvil block which serves as a support for the work while the jaws which move angularly may engage the work and bend it about a thimble or the like into desired position while the work engages the anvil block.

Another object of this invention is to provide a removable block or rest providing a supporting surface for the work which may be readily adjustable as to height which its surface provides by selecting the proper rotative position of the block about its center.

With these and other objects in view, the invention consists of certain novel features of construction, as will be more fully described and particularly pointed out in the appended claims.

In the accompanying drawings:

Fig. 1 is an elevational view of the work fragmentally shown as partially moved to finished position prior to its splice being made;

Fig. 2 is a view similar to Fig. 1 omitting the work and illustrating the opposite side of the frame or body;

Fig. 3 is a section on line 3—3 of Fig. 1;

Fig. 4 illustrates the anvil block alone;

Fig. 5 is an edge view thereof;

Fig. 6 illustrates the work completed and served.

In proceeding with this invention I provide a body or frame supported on a table and slot this body so as to provide guides for jaw carriages which will engage the work. These jaws are caused to move along lines which are at an obtuse angle to each other. A downwardly open slot is also provided to accept a ring which may be hung in a thimble about which the splice is to be made. The jaws move simultaneously toward each other or away from each other in response to the rotation of the single handle.

With reference to the drawing I have illustrated in section a table 10 having a slot 11 therein. The table is supported by legs 12 and 13 in some manner, such for instance as crossing the legs so as to allow freedom for positioning the work in the slot in the table. The body framework of the vise proper is designated 15 and is supported in upright position on the table through bracket 16 bolted to the body as at 17 and held upon the table 10 by any suitable connection such for instance as by welding. The body 15 is slotted to open downwardly as at 18 which slot registers with the slot 11 in the table top. This slot extends well upwardly into the body as at 19 and is provided with a series of pairs of notches 20, 20', 21, 21', 22, 22', and 23, 23', on either side of the slot for locking engagement with a projection on an anvil block.

The anvil block 25 is a square form providing surfaces 26, 27, 28, and 29, each grooved as at 30 (see Fig. 5) for the reception and support of the wire work. A boss 31 extends from one surface of the block and is generally circular in form located eccentrically to the center of the block. Projections 32, 32', 33, 33' extend outwardly from the surface of this boss and are of a size to fit the notches 20, 20', or 21, 21', or 22, 22', or 23, 23' of the slot as may be selected. The notches just enumerated may be one inch apart while the eccentricity of the boss 31 is such as to position the block at quarter inch intervals as to height depending upon which of the supporting surfaces 26, 27, 28, or 29 is selected to be uppermost. This variation will accommodate thimbles of different sizes.

The body framework 15 is arranged so that slot 18 is substantially vertical. On either side of the vertical center line of the slot 18 I provide guide slots 35 and 36 which accommodate jaw carriers 37 each having a stud 38 to extend through the slot 36. A boss 39 on the carrier is provided with a threaded opening 40 to accommodate threaded shaft 41 which is rotatably mounted in bearings 42 and 43 located on one surface of the body frame. The shafts 41 are each provided with a beveled gear 52 and these gears mesh on a pitch line which coincides with the center line of the slot 18. By this arrangement when one of the shafts 41 is turned such for instance as by handle 53 and crank arm 54 both threaded shafts will be rotated simultaneously. Each jaw 45 is swively mounted upon the reduced portion 46 of the stud of the carrier 37. The jaw 45 is held in position by a nut 47 on the reduced threaded portion 48 which nut shoulders as at 49 to prevent binding on the jaw 45. Each jaw 45 is generally semi-circular as shown in Fig. 1 and is provided with an arcuate recess in its engaging edge 50 for the reception of the wire work designated 51 which consists of stranded wire which is to be spliced. Each jaw is swiveled about the stud 46 so as to freely follow the work as the jaws are moved angularly toward each other in response to the movement of the threaded shafts 41.

In operation the thimble carrying a ring 56 is first positioned adjacent the slot 18 so that part of the ring extends into the slot and then the block is placed within the ring and inserted in the slot. The jaws will be moved outwardly away from the center line and the work which is usually served as at 54 will be laid in upon one of the surfaces 26, 27, 28, 29 of the anvil depending upon the diameter of the work. Then, as the handle is rotated the jaws will bend the work about the thimble 55. As the jaws approach each other they will fold the wire about the thimble so as to cause the portions of the wire to come into such close proximity and be held that the splice may be readily made. After the splice is made a serving 57, as shown in Fig. 6, is placed upon it and the thimble is thus positioned snugly within the splice with the ring in the thimble.

I claim:

1. In a rigger's vise, a body portion having an elongate and open-end slot extending inwardly from one side thereof, a pair of jaws on said body portion adjacent a side opposite to said slotted side, means on the body portion to guide said jaws each at an acute angle to the center line of said slot and at an obtuse angle to each other, a removable block insertable in said slot to serve as an anvil for a thimble and a cable to be spliced therearound, and cooperating means between the edges of said slot and said block to hold said block in position in said slot, said slot and removable block permitting a ring member to be interlinked with said thimble, in preparation for the splicing operation, and permitting removal of the interlinked assembly, after completion of the splicing operation.

2. In a rigger's vise, a body portion having an elongate and open-end slot extending inwardly from one side thereof, a pair of jaws on said body portion adjacent a side opposite to said slotted side, means on the body portion to guide said jaws each at an acute angle to the center line of said slot and at an obtuse angle to each other and a removable block insertable in said slot to serve as an anvil for a thimble and a cable to be spliced therearound, the edges of said slot being provided with a series of notches, said block being provided with a boss located eccentric to the edges of said block and having projections insertable in selected notches of said series to locate the anvil portion of said block at a selected position in said body, said slot and removable block permitting a ring member to be interlinked with said thimble, in preparation for the splicing operation, and permitting removal of the interlinked assembly, after completion of the splicing operation.

3. In a rigger's vise, a body having a pair of guide slots therein adjacent an upper edge portion, said guide slots extending at an obtuse angle to each other, jaw carriers guided by said slots, means for simultaneously moving said carriers toward each other, jaws swivelly mounted on said carriers, said body also having an elongate and open-end slot extending upwardly from a lower edge portion, said slot having a longitudinal axis bisecting said obtuse angle of said guide slots, and a removable block insertable in said slot to serve as an anvil for a thimble and a cable to be spliced therearound, said slot and removable block permitting a ring member to be suspended from said thimble, during the splicing of said cable, and permitting removal of the assembled thimble and ring member, after completion of the splicing operation.

ERICH GAULKE.

REFERENCES CITED

The following references are of record in the file of this patent:

UNITED STATES PATENTS

| Number | Name | Date |
|---|---|---|
| 1,050,301 | Schenk | Jan. 14, 1913 |
| 1,319,562 | Brown | Oct. 21, 1919 |
| 1,731,468 | Lind | Oct. 15, 1929 |
| 1,966,338 | Eggimann | July 10, 1934 |
| 2,028,610 | Jacoel | Jan. 21, 1936 |
| 2,144,321 | Bauberger et al. | Jan. 17, 1939 |
| 2,323,774 | Jacoel | July 6, 1943 |
| 2,388,862 | Merriman | Nov. 13, 1945 |

FOREIGN PATENTS

| Number | Country | Date |
|---|---|---|
| 107,632 | Germany | Jan. 11, 1900 |
| 5,796 | Great Britain | Mar. 20, 1905 |
| 296,454 | Germany | Feb. 8, 1917 |